(12) United States Patent
Lee

(10) Patent No.: US 6,703,462 B2
(45) Date of Patent: Mar. 9, 2004

(54) STABILIZED POLYMER FILM AND ITS MANUFACTURE

(75) Inventor: Chung J. Lee, Freemont, CA (US)

(73) Assignee: Dielectric Systems Inc., Fremont, CA (US)

( * ) Notice: Subject to any disclaimer, the term of this patent is extended or adjusted under 35 U.S.C. 154(b) by 0 days.

(21) Appl. No.: 09/925,712

(22) Filed: Aug. 9, 2001

(65) Prior Publication Data

US 2003/0036617 A1 Feb. 20, 2003

(51) Int. Cl.$^7$ ............................................... C08F 114/18
(52) U.S. Cl. .................... 526/242; 526/348; 526/348.1; 526/346
(58) Field of Search ............................. 526/348, 348.1, 526/346, 242

(56) References Cited

U.S. PATENT DOCUMENTS

| | | | |
|---|---|---|---|
| 3,288,728 A | | 11/1966 | Gorham |
| 3,342,754 A | * | 9/1967 | Gorham ........................ 260/2 |
| 3,349,045 A | | 10/1967 | Gilch |
| 3,379,803 A | | 4/1968 | Tittmann et al. |
| 3,503,903 A | | 3/1970 | Shaw et al. |
| 3,626,032 A | | 12/1971 | Norris |
| 5,268,202 A | | 12/1993 | You et al. |
| 5,538,758 A | | 7/1996 | Beach et al. |
| 5,879,808 A | | 3/1999 | Wary et al. |
| 5,958,510 A | | 9/1999 | Sivaramakrishnam et al. |
| 6,130,171 A | * | 10/2000 | Gomi ........................ 438/781 |
| 6,140,456 A | * | 10/2000 | Lee et al. .................... 528/196 |
| 6,265,320 B1 | | 7/2001 | Shi et al. |

FOREIGN PATENT DOCUMENTS

| | | |
|---|---|---|
| EP | 0 349 032 A2 | 1/1990 |
| EP | 0 523 479 A2 | 1/1993 |
| EP | 0 856 503 A1 | 8/1998 |
| GB | 650 947 | 3/1951 |
| GB | 673 651 | 6/1952 |
| WO | WO 97/15699 | 5/1997 |

OTHER PUBLICATIONS

Greiner, "Poly(1,4–xylylene)s: polymer films by chemical vapour deposition", TRIP, vol. 5(1), 12(1997).*

Chow, S. W., et al., "Poly ($\alpha,\alpha,\alpha',\alpha'$–tetrafluoro–p–xylylene)," Journal of Applied Polymer Science, New York, NY< US, vol. 13, No. 9, 1969, pp. 2325–2332.

Greiner, A, "Poly(1,4–xylylene)s: Polymer Films by Chemical Vapour Deposition," Trends in Polymer Science, Elsevier Science Publishers B. V. Amsterdam, NL, vol. 5, No. 1, 1997, pp. 12–16.

Lang, C–I, "Vapor Deposition of Very low k Polymer Films, Poly (Naphthalene), Poly (Fluorinated Naphthalene)" Materials Research Society Symposium Proceedings, Materials Research Society, Pittsburgh, PA US, vol. 381, Apr. 17, 1995, pp. 45–50.

Sharma, A. K., et al., "Optimizing Poly(chloro–p–Xylylene) or Parylene C Synthesis," Journal of Applied Science, John Wiley and Sons, Inc., New York, US, vol. 36, No. 7, Sep. 20, 1988, 1555–1565.

Gill, W. N. et al., "High Deposition Rate Parylene Films," Journal of Crystal Growth, North–Holland Publishing Co., Amsterdam, NL, vol. 183, No. 3, 1998, pp. 385–390.

Morgen, M., et al., "Morphological Transitions in Fluorinated and Non–Fluorinated Parylenes," Material Research Society Symposium Proceedings, vol. 565, 1999, pp. 297–302.

Harrus, A. S., et al., "Parylene Af–4: A Low $\epsilon_R$ Material Candidate for ULSI Multilevel Interconnect Applications," Material Research Society Symposium Proceedings, vol. 443, 1997.

Ryan, E. T., et al., "Effect of Deposition and Annealing on the Thermomechanical Properties of Parylene Films," Material Research Society Symposium Proceedings, vol. 476, 1997, pp. 225–230.

Plano, M. A., et al., "The Effect of Deposition Conditions on the Properties of Vapor–Deposited Parylene AF–4 Films," Material Research Society Symposium Proceedings, vol. 476, 1997, pp. 213–218.

Mathur, D., et al., "Vapor Deposition of Parylene–F Using Hydrogen as Carrier Gas," Journal of Materials Research, vol. 14, No. 1, 1999, pp. 246–250.

International Search Report, dated Nov. 28, 2002.

* cited by examiner

*Primary Examiner*—Ling-Siu Choi
(74) *Attorney, Agent, or Firm*—Jackson Walker L.L.P.

(57) ABSTRACT

Poly (para-xylylene) ("PPX") polymer films are processed under particular conditions in order to maintain their stability for use in integrated circuits. This is primarily achieved by controlling the substrate temperature, feed rate of the polymer precursors, and the environmental conditions. The resulting films are stable at high temperatures and compatible with other film layers.

27 Claims, No Drawings

STABILIZED POLYMER FILM AND ITS MANUFACTURE

The present invention relates to a polymer film that is used in the manufacturing of future integrated circuits ("IC's") and, in particular, to methods of making a polymer film that will retain their structural integrity during and after exposure to processes involved in the fabrication of IC's.

BACKGROUND

During the manufacturing of IC's, multiple layers of films are deposited. Maintaining the compatibility and structural integrity of the different layers throughout the processes involved in finishing the IC is of vital importance. In addition to dielectric and conducting layers, its "barrier layer" may include metals such as Ti, Ta, W, and Co and their nitrides and silicides, such as TiN, TaN, TaSixNy, TiSixNy, WNx, CoNx and CoSi Nx. Ta is currently the most useful barrier layer material for the fabrication of future IC's that use copper as conductor. The "cap layer" normally consists of dielectric materials such as SiN, SiON, TEOS, SiyOx, FTEOS, SiCOH, and SiCH.

Poly (para-xylylene) ("PPX") thin films, which have low dielectric constants ("∈"), are found in various forms. PPX thin film has the repeating unit of $(-CX_2-C_6H_{4-n}Z_n-X_2C-)_N$, where X and Z are the same or different and each is H or a halide; n=0 to 4, and N is an integer denoting the number of repeating units, ranging from at least 10 to preferably at least 20, and more preferably at least 50. These films are useful in the manufacturing of future IC's for several reasons. PPX-F i.e. $[(-CX_2-C_6H_{4-n}Z_n-X_2C-)_N$, where X=F, Z=H, n=0, and N as defined above] films prepared from dimers have shown, through X-Ray Photo Spectroscopy ("XPS"), undetectable changes in chemical composition after annealing at 425° to 450° C. for two hours in a vacuum (Plano et al., MRS Symp. Proc., Vol 476, (1998)). In addition, using the bending beam technique, it has been shown that PPX-F films are dimensionally stable up to the same temperature range after the first thermal cycle (Ho et al., MRS Spring Meeting Proceeding, Section 06.9 (1999)). It is also known that PPX-F films adsorb less than 0.02–0.04% moisture at ambient temperatures.

Various attempts to integrate PPX-F thin films into IC's using Cu Dual Damascene processes have failed (Wary et al., Proc. 2$^{nd}$ Intl. DUMIC (1996); Wary et al., Semiconductor Int'l, 19(6) (1996); Lu et al., J. Mater. Res., Vol. 14(1) (1999); Plano et al., MRS Symp. Proc., Vol 476, (1998)). None of the previous studies teaches processes or methods to make PPX-F films that pass the Ta compatibility test. A compatibility test uses a sample consisting of a thin (50 to 200 Angstrom) barrier or cap layer, such as Ta or SiC over a dielectric layer, such as PPX-F, on a silicon wafer. The sample is then subjected to increasing temperatures at different lengths of time and the structural integrity of the film layers is recorded. In the previous tests, the Ta barrier layer failed after the sample was annealed at 350° C. for 30 minutes under inert conditions.

What is needed, therefore, is a method for integrating a PPX film into future IC's that maintains the film's stability and compatibility with other layers.

SUMMARY AND DETAILED DESCRIPTION

An object of the present invention is to provide a PPX film that is suitable for fabrication of IC's using the Cu Dual Damascene process.

Another object is to provide processing methods that will make a PPX film that is compatible with barrier layer materials used in the manufacturing of future IC's.

A further object is to provide processing methods that will make a PPX film that is compatible with cap layer materials used in the manufacturing of future IC's.

Another object is to provide processing methods that will make a PPX film that remains stable at the high temperatures encountered in the manufacturing of future IC's.

In one embodiment of the present invention, there is a polymer film suitable for the fabrication of future IC's. It is preferably prepared by the process of polymerization of diradical intermediates under a vacuum with a low system-leakage-rate, or an inert atmosphere or both. The inert atmosphere is preferably devoid of free radical scavengers or compounds containing active hydrogen. In a specific embodiment, the diradical intermediate has the general structure $e-CX_2-Ar-X_2C-e$, where X=H or F, Ar is an aromatic diradical containing 6 to 30 carbons, and e is a free radical having an unpaired electron. In additional specific embodiments, the aromatic diradical is $C_6H_{4-n}-F_n$ (where n=0 to 4), $C_{10}H_{6-n}-F_n$ (where n=0 to 6), $C_{12}H_{8-n}-F_n$ (where n=0 to 8), $C_{14}H_{8-n}-F_n$ (where n=0 to 8), or $C_{16}H_{8-n}-F_n$ (where n=0 to 8). In further specific embodiments, the repeat unit of the polymer is $CH_2-C_6H_4-H_2C$, $CF_2-C_6H_4-F_2C$, $CF_2-C_6F_4-F_2C$, $CH_2-C_6F_4-H_2C$, $CF_2-C_6H_2F_2-CF_2$, or $CF_2-C_6F_4-H_2C$. In other preferred embodiments, the vacuum is lower than 100 mTorrs, and preferably below 30 mTorrs. In further specific embodiments, the system leakage rate is less than about 2 mTorrs per minute, preferably less than 0.4 mTorrs/minute. In another preferred embodiment, the polymer film has a melting temperature ("$T_m$") greater than its reversible crystal transformation temperature ("$T_2$"), which is greater than its irreversible crystal transformation temperature ("$T_1$"), which is greater than its glass transition temperature ("$T_g$"). In an additional specific embodiment, the polymer film is a fluorinated or unfluorinated PPX film having a general structure of $(-CX_2-C_6H_{4-n}Z_n-X_2C-)_N$, where X=H or F, Z=H or F, n is an integer between 0 and 4, and N is the number of repeat units, greater than 10. Preferably, N is greater than 20 or 50 repeat units. In another embodiment, the PPX film is transparent and semicrystalline. In further specific embodiment, the PPX film is PPX-F, which has a repeating unit with the structure of $CF_2-C_6H_4-F_2C$.

Another preferred embodiment is a method for preparing the polymer films by polymerizing the diradical intermediates at temperatures at or below their melting temperatures and with a low feed rate. In specific embodiments for the preparation of PPX-F films, the temperature of the substrate is lower than −30° C. and preferably below −35° C. The feed rate may be lower than 1.0 mMol/minute and preferably below 0.05 mMol/minute. In a specific embodiment, the method uses diradical intermediates with the general structure $e-CX_2-Ar-X_2C-e$, where X=H or F, Ar is an aromatic diradical containing 6 to 30 carbons, and e is a free radical having an unpaired electron. In additional specific embodiments, the aromatic diradical used is $C_6H_{4-n}-F_n$ (where n=0 to 4), $C_{10}H_{6-n}-F_n$ (where n=0 to 6), $C_{12}H_{8-n}-F_n$ (where n=0 to 8), $C_{14}H_{8-n}-F_n$ (where n=0 to 8), or $C_{16}H_{8-n}-F_n$ (where n=0 to 8). In further specific embodiments, the repeat unit of the polymer created by the method is $-CH_2-C_6H_4-H_2C-$, $-CF_2-C_6H_4-F_2C-$, $-CF_2-C_6F_4-F_2C-$, $-CH_2-C_6F_4-H_2C-$, $-CF_2-C_6H_2F_2-CF_2-$, or $-CF_2-C_6F_4-H_2C-$. In other preferred embodiments, the vacuum utilized is lower than 100 mTorrs, and preferably below 30 mTorrs. In further specific embodiments, the system leakage rate is less than about 2 mTorrs per minute, preferably less than 0.4 mTorrs/minute. In another preferred embodiment, the polymer film produced by the method has a melting temperature ("$T_m$") greater than its reversible crystal transformation temperature ("$T_2$"), which is greater than its irreversible crystal transformation temperature ("$T_1$"), which is greater than its glass transition temperature ("$T_g$").

In an additional specific embodiment, the method generates a fluorinated or non-fluorinated PPX film having a general structure of ($-CX_2-C_6H_{4-n}Z_n-X_2C-$)$_N$, where X=H or F, Z=H or F, n is an integer between 0 and 4, and N is the number of repeat units, greater than 10. Preferably, N is greater than 20 or 50 repeat units. In another embodiment, the PPX film generated is transparent and semicrystalline. In further specific embodiment, the PPX film is PPX-F.

In an additional specific embodiment, the method also includes heating the polymer film under an inert atmosphere to a temperature ranging from 20° to 50° C. below $T_2$ to 20° to 50° C. below $T_m$, holding the sample isothermally for 1 to 120 minutes, then cooling the sample at a rate ranging from 30° to 100° C./minute, to a temperature ranging from 20° to 50° C. below $T_2$. Preferably, the sample is held isothermally for between 2 and 60 minutes and is cooled at a rate of 50° to 100° C./minute. In another embodiment, the method for preparing the films also includes annealing them at temperatures 30° to 50° C. above their $T_g$ for 5 to 60 minutes. This annealing process may also be performed at a temperature above $T_1$ and is ideally done between 15 to 30 minutes. In a further preferred embodiment, the polymer film is stabilized by annealing the film at a temperature equal to or higher than the maximum temperature the polymer will encounter during the fabrication of IC's for 10 to 60 minutes, and preferably 30 to 60 minutes.

Additional preferred embodiments include an active matrix liquid crystal display ("AMLCD") and a fiber optical device that include the stabilized polymer films described in this invention.

DETAILED DESCRIPTION OF THE PREFERRED EMBODIMENTS

Broadly, the present invention pertains to processing methods of polymer films that exhibit at least an irreversible crystal transformation temperature ("$T_1$"), a reversible crystal transformation temperature ("$T_2$") and a crystal melting temperature, $T_m$.

I. Structure and Characteristics of PPX Films

The polymer films of this invention have a general chemical structure of ($-CX_2-Ar-X_2C-$)$_N$, where X=H or F and Ar is an aromatic moiety. Examples of the aromatic moiety, Ar, include, but are not limited to, the phenyl moiety, $C_6H_{4-n}F_n$ (n=0 to 4), including $C_6H_4$ and $C_6F_4$; the naphthenyl moiety, $C_{10}H_{6-n}F_n$ (n=0 to 6), including $C_{10}H_6$ and $C_{10}F_6$; the di-phenyl moiety, $C_{12}H_{8-n}F_n$ (n=0 to 8), including $C_6H_2F_2-C_6H_2F_2$ and $C_6F_4-C_6H_4$; the anthracenyl moiety, $C_{12}H_{8-n}F_n$ (n=0 to 8); the phenanthrenyl moiety, $C_{14}H_{8-n}F_n$ (n=0 to 8); the pyrenyl moiety, $C_{16}H_{8-n}F_n$ (n=0 to 8) and more complex combinations of the above moieties, including including $C_{16}H_{10-n}F_n$ (n=0 to 10). Isomers of various fluorine substitutions on the aromatic moieties are also included. Preferably, Ar is $C_6F_4$, $C_6H_4$, $C_{10}F_6$, or $C_6F_4-C_6F_4$.

In addition, all fluorinated or non-fluorinated PPX films that have a general structure of ($-CX_2-C_6H_{4-n}Z_n-X_2C-$)$_N$ can be used in the processing conditions described in this invention. In these PPX films, X=H or a halide, Z=H or F, n=0 to 4, and N is the number of repeat units. N should be at least 10, preferably at least 20, and more preferably at least 50.

Any material with a low dielectric constant, such as a PPX film, has to possess several important attributes to be acceptable for integration into IC's.

First, the dielectric should be compositionally and dimensionally stable. The structural integrity should remain intact after integration into the IC's and throughout the fabrication processes. These processes include reactive ion etching ("RIE") or plasma patterning, stripping of photoresist, chemical vapor or physical vapor deposition ("CVD" or "PVD") of barrier and cap materials, electroplating and annealing of copper and chemical mechanical polishing ("CMP") of the copper. In addition, to maintain its electrical integrity after the IC fabrication, the dielectric should be free from contamination by barrier materials such as Ta.

Also, the dielectric should not cause the structural or chemical breakdown of a barrier or cap layer. No corrosive organic elements, particularly any that would cause interfacial corrosion, should diffuse into the barrier or cap material. In addition, the dielectric should have sufficient dimensional stability so that interfacial stress resulting from a Coefficient of Thermal Expansion ("CTE")-mismatch between the dielectric and barrier or cap layer would not induce structural failure during and after the manufacturing of the IC's.

Finally, the interfaces of the dielectric and barrier or cap layers should be free from moisture, preventing the occurrence of ionic formation and/or migration when the IC's are operated under electrical bias.

The PPX films can be prepared by polymerization of their corresponding reactive diradical intermediates via transport polymerization. (Lee, J., Macromol, et al., Sci-Rev. Macromol. Chem., C16(1) (1977–78)). Examples of the PPX films and their repeat units resulting from polymerization of the diradical intermediates include commercially available products, such as: PPX-N ($-CH_2-C_6H_4-CH_2-$); PPX-F ($-CF_2-C_6H_4-CF_2-$); and perfluoro PPX ($-CF_2-C_6F_4-CF_2-$).

In general, diradical intermediates can be prepared from pyrolysis of corresponding dimers according to the Gorham method (U.S. Pat. No. 3,342,754). They can also be prepared by pyrolysis of monomers and co-monomers (see U.S. patent application "Integration of Low ε Thin Film and Ta Into Cu Dual Damascene," Ser. No. 09/795,217, the entire content of which is hereby incorporated by reference) under vacuum conditions or an inert atmosphere. The vacuum should be lower than about 100 mTorrs, preferably about 30 mTorrs. The vacuum system should also have an air or system leakage rate of less than about 2 mTorrs/minute, preferably about 0.4 mTorrs/minute. An inert atmosphere is an atmosphere that is devoid of free radical scavengers such as water and oxygen, or devoid of a compound containing an "active hydrogen," such as an $-OH$, $-SH$, or $-RNH$ group.

The resultant PPX products can be transparent or opaque films or in powder form depending on processing conditions. Only continuous films can be useful for IC manufacturing applications. Opaque films which contain cracks or spherulites with crystal sizes even in sub-micrometer range are not useful for this invention. Transparent films can be in an amorphous or semicrystalline PPX phase. When its crystalline phase is less than 10 nm or lower, semicrystalline PPX films can be useful for the manufacturing of future IC's. Amorphous PPX films consist of random polymer chain orientations, which will create equal interfacial stress in all directions, thus avoiding problems that are associated with semi-crystalline polymers. However, amorphous PPX films that consist of a regular chemical structure or repeating unit in their backbone structures can be re-crystallized into semicrystalline films. For example, these amorphous PPX films can transform into semicrystalline films when they are exposed to temperatures 20° to 30° C. above their glass transition temperature, $T_g$. Since re-crystallization will induce dimensional change and PPX-N and PPX-F have $T_g$'s of only about 65 and 172° C. respectively, the amorphous or low crystalline PPX-N and PPX-F are not useful for the manufacturing of future IC's.

Transparent semicrystalline PPX-N films have been obtained by controlling primarily the substrate temperature and chemical feed rate under a particular range of vacuum pressure in a deposition chamber. Detailed conditions and general mechanisms for making transparent semicrystalline PPX-N films have been described previously (Wunderlich et at., J. Polym. Sci. Polym. Phys. Ed., Vol. 11(1973) and Wunderlich et al., J. Polym. Sci. Polym. Phys. Ed., Vol. 13 (1975)). The suitable vacuum range is about 1 to about 100 mTorrs, preferably about 5 to about 25 mTorrs. Under this vacuum range, the crystal form and crystallinity are result directly from the feed rate and substrate temperature. Suitable substrate temperatures can range from about −10° to about −80° C., preferably from about −25° to about −45° C. During IC fabrication, wafer temperature is controlled by the cooling of an electric chuck or a wafer holder using a coolant. A wafer temperature below about −45° C. is desirable for obtaining a high deposition rate, but it requires a special, expensive coolant such as fluorocarbon fluid or silicone oil.

It should be noted that at very low substrate temperatures, about −50° to −60° C., nucleation rates can be very high and hetero-epitaxial or highly oriented crystal growth is possible. The resulting polymer crystals would therefore be in "transcyrstalline" or "columnar" forms. At these low temperature ranges, diradicals are absorbed very rapidly and the film growth rates are very high. However, this is achieved at the expense of the resulting crystallinity due to the entrapment of low molecular weight PPX-F units or other defects. A PPX-F film with low crystallinity can have poor dimensional stability at temperatures above its $T_g$, about 172° C. PPX-F films prepared under these conditions thus still need to be properly annealed before they can be useful for the manufacturing of future IC's. Thin films consisting of even more than few percent of low molecular weight PPX-F polymers are not useful due to the poor dimensional and chemical stability during the manufacturing of IC's.

Therefore, under the vacuum range of a few mTorrs and at substrate temperatures ranging from about −25° to about −45° C., desirable thin films with high crystallinity can be obtained by adjusting the feed rate of the precursors. Depending on the chemistries and precursors employed for the preparation, the feed rates can be very different. For example, at a feed rate from 1 to 3 standard cubic centimeter per minutes ("sccm") of the monomer $Br-CF_2-C_6H_4-CF_2-Br$ and at a substrate temperature from about −30° to about −45° C., crystalline PPX-F films can be obtained. When the substrate temperature is higher than about 10° to 20° C., nucleation is difficult due to the low adsorption of diradical intermediates. However, under very high feed or flow rates, polymer crystal growth can still be possible after an induction period to overcome primary nucleation on the substrate. PPX-F films prepared under these conditions can have high crystallinity. Even without annealing, these PPX-F films can be useful for integration into future IC's. Furthermore, it is possible to prepare a high temperature crystal form of PPX-F at substrate temperatures above 40°–60° C. though the deposition rate will suffer enormously.

II. Methods for Making Dimensional Stable Films

However, without proper processing conditions, even highly crystalline PPX films obtained through re-crystallization will fail when subjected to fabrication processes currently employed for making IC's. In the IC's that use electrically plated copper as a conductor, the required annealing temperature for the copper ranges from 300° C. for one hour to 350° C. for 30 minutes. Some integration processes also require a substrate temperature of 400° C. In addition, during packaging operations of the IC's, such as wire bonding or solder reflow, structural stability of the dielectric at temperatures as high as 300° to 350° C. is also required. Therefore, any useful PPX film needs to be chemical and dimensionally stable at temperatures up to 300° to 350° C., preferably 350° to 400° C. for at least 30 minutes.

DSC measurements, performed at a 10° to 15° C. per minute heating rate and under a nitrogen atmosphere, show a peak $T_g$ for PPX-F around 170° C. and an Alpha to Beta-1 irreversible crystal transformation temperature, ("ICT"), ranging from 200° to 290° C. with a peak temperature, $T_1$, around 280° C. In addition, there are also a Beta-1 to Beta-2 reversible crystal transformation temperature ("RCT"), ranging from 350° to 400° C. with a peak $T_2$ around 396° C. and a melting temperature, $T_m$, ranging from 495° to 512° C. with a peak Tm around 500° C. For comparison, the corresponding $T_g$, $T_1$, $T_2$, and Tm for PPX-N are respectively, 65°, 230°, 292° and 430° C. (Wunderlich et at., J. Polym. Sci. Polym. Phys. Ed., Vol. 11(1973) and Wunderlich et al., J. Polym. Sci. Polym. Phys. Ed., Vol. 13 (1975)). The Alpha to Beta-1 crystal transformation occurring at $T_1$ is irreversible, while the Beta-1 to Beta-2 crystal transformation, at $T_2$, is reversible for both PPX-N and PPX-F. When a crystalline PPX-N or PPX-F film is exposed to temperatures approaching its $T_1$, polymer chains in its Alpha crystalline phase will start to reorganize and transform into a more thermally stable Beta-1 crystal phase. Once this happens, the film will never show its Alpha phase again, even by cooling the film below its $T_1$. However, if a PPX-N or PPX-F film is cooled slowly from at or above its $T_2$ to a temperature below its $T_2$, the less dimensionally stable Beta-1 crystal phase will reform.

One way to maximize the dimensional stability of the PPX-N or PPX-F film is to trap the polymer chains in their most thermally stable form, the Beta-2 crystal phase, if the film is to be used or exposed to temperatures approaching $T_2$. Then, if the film is exposed to temperatures approaching or surpassing its $T_2$, crystal transformation cannot occur, because the film is already in its Beta-2 form. Eliminating this phase transformation ensures the dimensional stability of the film. In principle, when the film is in its Beta-2 crystal phase, its dimensional stability is still assured even at temperatures approaching 50° to 60° C. below its $T_m$. A highly crystalline (greater than 50% crystallinity) PPX-F film in a Beta-2 crystal phase can be dimensionally stable up to 450° C. for at least 30 minutes, limited only by its chemical stability.

During integration into IC's, two processing methods can be used to assure the dimensional stability of all polymer films that exhibit a reversible crystal transformation temperature, $T_2$, and a crystal melting temperature, $T_m$.

First, the feed rate and substrate temperature can be optimized during film deposition to achieve highly crystalline films in the Beta-2 crystal phase.

By controlling the feed rate and substrate temperatures, semicrystalline films consisting of either Alpha or Beta phase crystals have been prepared (Wunderlich et al., J.

Polym. Sci. Polym. Phys. Ed., Vol. 11 (1973) and Wunderlich et al., J. Polym. Sci. Polym. Phys. Ed., Vol. 13 (1975)). When the substrate temperature is lower than the melting temperature of its intermediate diradical, Tdm, and when the feed rate is low (less than 0.07 g/minute), the polymerization of crystalline diradicals can result in PPX-N films that are predominantly in the Beta crystal phase and have high crystallinity. On the another hand, when the substrate temperature is higher than the Tdm, polymerization of liquid diradicals and subsequent crystallization of polymers often results in PPX-N films that are in the Alpha crystal phase and have low crystallinity.

Second, stabilized films can be obtained by heating the films to temperatures above their $T_2$ under inert conditions, such as under a nitrogen atmosphere or under a vacuum, and then quickly quenching the films to at least 30° to 60° C. below their $T_2$. A PPX-F film that is predominantly in the Beta-2 crystal phase has been obtained by heating the film to 450° C. for 30 minutes, then quenching the film to 330° C. at a cooling rate of more than 50° C./minute.

Actual polymer chain motions for solid state transition or phase transformation can start from 30° to 60° C. below the corresponding $T_g$, $T_1$, $T_2$ and $T_m$ depending on the history of the films, degree of crystallinity, perfection of crystals, or the existence of various low molecular weight material in the crystalline phase (Wunderlich, Macromolecular Physics, Vol. 1–2 (1976). In fact, the Beta-1 to Beta-2 transition can start at temperatures ranging from 40 to 50° C. below $T_2$, (about 396° C.) for PPX-F films. Therefore, by exposing a deposited PPX-F film to 350° C. for one hour, the quenched PPX-F film also exhibited a high content of Beta-2 phase crystallinity. The presence of Beta-2 crystals can be verified by DSC. When a PPX-F film containing a high percentage of Beta-2 phase crystals was scanned by DSC from 25 to 510° C. under a nitrogen atmosphere, only $T_m$ was observed and not $T_1$ or $T_2$.

The maximum temperature, $T_{max}$, which is encountered during the manufacturing of IC's, will undoubtedly be lowered over time due to technological advancements. Improvements in copper plating chemistries and the perfection of the resulting copper films will lower the required annealing temperatures. In addition, physical vapor deposition temperatures for barrier layers or cap layers could be reduced to temperatures below 400° C. Once this occurs, the maximum processing temperature, $T_{max}$, can be lowered to temperatures below 350° C., possibly as low as 325° to 300° C. In that case, the annealing of PPX-F films can be performed at temperatures 30° to 50° C. below $T_2$ (396° C. for PPX-F) or as low as temperatures 10° to 20° C. above $T_1$ (280° C. for PPX-F). However, the annealing should be done at a temperature equal to or higher than the $T_{max}$ for 1 to 60 minutes and preferably for 3 to 5 minutes.

III. EXPERIMENTAL RESULTS

The following are offered by way of example, and are not intended to limit the scope of the invention in any manner.

Experiment 1

Deposition of PPX-F was performed using a system that consisted of a quartz reactor heated to a temperature of about 580° C. by an infrared heater. The quartz reactor had a volume of 40 cm$^3$ and Stainless Steel wool was used as an insert to provide an internal surface area of about 800 cm$^2$. The precursor, Br—CF$_2$—C$_6$H$_4$—CF$_2$—Br, was heated in a sample holder at 65° C. to achieve a feed rate of at least 0.06 mMol/minute and transported to the reactor via a needle valve, under a system vacuum of about 12 mTorrs. The reacted precursors or diradical intermediates were transported to a 200-mm wafer that was kept at −30° C. using an electrical static chuck ("ESC"). The resulting film was scanned by DSC at a 15° C./minute heating rate from 25° to 550° C. and under a nitrogen atmosphere. The DSC scan showed a $T_g$ at about 168° C., a $T_1$ at 289° C., a $T_2$ of about 395° C., and a $T_m$ of 498° C. (all peak temperatures). The corresponding heats of transformation for $T_g$, $T_1$, $T_2$ and $T_m$ were, respectively, 0.2, 4.2, 5.6 and 5.9 J/g, evidence of a film with low crystallinity in the Alpha crystal phase.

Experiment 2

The film obtained from Experiment 1 was heated to 425° C. at a 15° C./minute heating rate, held isothermally at about 425° C. for 120 minutes under a nitrogen atmosphere, then cooled at 15° C./minute to room temperature. The resulting sample was scanned by DSC at a 15° C./minute heating rate from 25° to 550° C. and under a nitrogen atmosphere. The DSC scan showed no detectable $T_g$ or $T_1$, but it did show a $T_2$ of about 395° C. and a $T_m$ of about 496° C. The corresponding heats of transformation for $T_2$ and $T_m$ were, respectively, 36.9 and 41.6 J/g, which is indicative of a high crystalline film having majority of Beta-1 crystals.

Experiment 3

The film obtained from Experiment 1 was heated to 450° C. at a 15° C./minute heating rate, held isothermally at about 450° C. for 120 minutes under a nitrogen atmosphere, then cooled at 15° C./minute to room temperature. The resulting films was then scanned in DSC at a 15° C./minute heating rate from 25° to 520° C. and under a nitrogen atmosphere. The DSC scan showed no detectable $T_g$, or $T_1$, but it did show a $T_2$ of about 395.8° C. and a $T_m$ of 499° C. The corresponding heats of transformation for $T_2$ and $T_m$ were 21 and 20.4 J/g respectively. Compared to the results that were obtained in Experiment 2, this annealed film showed a heat of melting that was lower by about 50%, indicating the occurrence of thermal decomposition during the long term (over 2 hours) annealing of this film.

Experiment 4

The film obtained from Experiment 1 was heated to 450° C. at a 15° C./minute heating rate under a nitrogen atmosphere, then cooled at 15° C./minute to room temperature. The resulting film was then scanned in DSC from 25 to 450° C. at a 15° C./minute heating rate and under a nitrogen atmosphere. The DSC scan showed a $T_2$ at 386.8° C. The heat of transformation at $T_2$ was 42.6 J/g. After cooling, the film thus consisted of Beta-1 crystals.

Experiment 5

The film obtained from Experiment 1 was heated to 450° C. at a 15° C./minute heating rate, held isothermally at about 450° C. for 30 minutes under a nitrogen atmosphere, then cooled at 50° C./minute to room temperature. The DSC cooling scan showed an exothermic peak at 392° C. and a heat of transformation of 37.8 J/g.

The resulting film was then scanned in DSC from 25° to 520° C. at a heating rate of 15° C./minute and under a nitrogen atmosphere. The DSC scan showed no detectable $T_g$ or $T_1$, but it did show a $T_2$ of about 401° C. and a $T_m$ of 499° C. The corresponding heats of transformation for $T_2$ and $T_m$ were respectively 26.8 and 50.9 J/g, which is indicative of a very high crystalline film having both Beta-1 and Beta-2 crystals.

Experiment 6

The film obtained from Experiment 1 was heated to 450° C. at a 15° C./minute heating rate, held isothermally at 450° C. for 30 minutes under a nitrogen atmosphere, then cooled at a 50° to 75° C./minute rate by purging with liquid nitrogen to room temperature. The resulting film was scanned in DSC at a 15° C./minute heating rate from 25° to 520° C. and under a nitrogen atmosphere. The DSC scan showed no detectable $T_g$, $T_1$, or $T_2$, but did show a $T_m$ of 499° C. The heat of transformation at $T_m$ was 40 J/g, indicative of a highly crystalline film in the Beta-2 crystal phase.

Experiment 7

Experiment 1 was repeated using an ESC temperature of −35° C. and a feed rate of 0.01 mMol/min. The resulting film was analyzed using the DSC. The film was heated to 520° C. at a 15° C./minute heating rate under a nitrogen atmosphere. The DSC scan showed a $T_2$ and $T_m$ respectively at 386° and 512° C. The corresponding heats of transformation were 14.8 and 33.1 J/g, indicative of a major portion of Beta-2 phase crystals (24%) and about an equal amount of Beta-1 phase crystals (20%).

Experiment 8

The film obtained from Experiment 7 was heated to 300° C. at a 15° C./minute heating rate, held isothermally at 300° C. for 60 minutes under a nitrogen atmosphere, then cooled at a 50° C./minute rate to room temperature in DSC. The resulting film was scanned in DSC at a 15° C./minute heating rate from 25° to 520° C. and under a nitrogen atmosphere. The DSC scan was similar to that of Experiment 7, indicative of low phase changes during annealing.

Experiment 9

The film obtained from Experiment 7 was heated to 300° C. at a 15° C./minute heating rate, held isothermally at 350° C. for 60 minutes under a nitrogen atmosphere, then cooled at a 50° C./minute rate to room temperature in DSC. The resulting film was scanned in DSC at a 15° C./minute heating rate from 25° to 520° C. and under a nitrogen atmosphere. The DSC scan showed a $T_2$ and $T_m$ respectively at 370° C. and 504° C. The corresponding heats of transformation were 18.8 and 53.1 J/g, indicative of a highly crystalline film with Beta-1 and Beta-2 crystal phases.

Experiment 10

The film obtained from Experiment 7 was heated to 300° C. at a 15° C./minute heating rate, held isothermally at 400° C. for 60 minutes under nitrogen atmosphere, then cooled at a 50° C./minute rate to room temperature in DSC. The resulting film was scanned in DSC at a 15° C./minute heating rate from 25° to 520° C. under a nitrogen atmosphere. The DSC scan showed a $T_2$ and $T_m$ respectively at 389.4° C. and 509° C. The corresponding heats of transformation were 20.3 and 55.6 J/g, indicative of a highly crystalline film with Beta-1 and Beta-2 crystal phases.

Experiment 11

The film obtained from Experiment 7 was heated to 300° C. at a 15° C./minute heating rate, held isothermally at 450° C. for 60 minutes under a nitrogen atmosphere, then cooled at a 50° C./minute rate to room temperature in DSC. The resulting film was scanned in DSC at a 15° C./minute heating rate from 25° to 520° C. and under a nitrogen atmosphere. The DSC scan showed a $T_2$ and $T_m$ respectively at 403° C. and 512° C. The corresponding heats of transformation were 39.8 and 50.5 J/g, indicative of a high crystalline film with Beta-1 & 2 crystal phases.

Experiment 12

The film obtained was heated to 400° C. inside a vacuum and held at that temperature for 30 minutes, then quenched at about a 100° C./minute cooling rate by removing it quickly from the vacuum oven. 200 Å of Ta were deposited over the film by physical vapor deposition ("PVD"). The sample was then annealed at 350° C. for 60 minutes under a nitrogen atmosphere, then cooled to room temperature. No observable damage to the Ta film was noticed.

The above results are summarized in the following Table 1, and the percentage of Alpha, Beta-1 and Beta-2 crystalline phases observed in each film obtained from the above experiments are analyzed.

Heats of transformation are taken respectively for Alpha to Beta-1, Beta-1 to Beta-2, and melting at temperature ranges of 200°–290° C., 350°–400° C. and 490°–512° C.

By assuming that when ΔHm=50 J/g, the crystallinity is at 70%, then the percentage of Alpha ("α"), Beta-1 ("$\beta_1$"), and Beta-2 ("$\beta_2$") crystalline phases can be obtained using the following equations:

% α=100*(ΔHα/50 J/g)

% $\beta_1$=100*(ΔH$\beta_1$/50 J/g)

% $\beta_2$=100*((ΔHm−Δ$\beta_1$)/50 J/g))

TABLE 1

Summary of Experimental Results

| Expt-01 | Conditions | % α | % $\beta_1$ | % $\beta_2$ | Method |
|---|---|---|---|---|---|
| 0503-AD | Ts = −30° C.<br>DR > 2000 Å/min | ≈7% | none | none | DSC |
| 0503-AN1 | 15 CPM to 425° C.<br>425° C./120 min<br>−15 CPM to 150° C. | | ≈49% | ≈7% | DSC |
| 0503-AN2 | 15 CPM to 450° C.<br>450° C./120 min<br>−15 CPM to 150° C. | | ≈28% | ≈0% | DSC |
| 0503-AN3 | 15 CPM to 450° C.<br>−15 CPM to 100° C. | | ≈56% | ≈0% | DSC |
| 0503-QN | 15 CPM to 450° C.<br>450° C./30 min<br>−50 CPM to 100° C. | | ≈35% | ≈35% | DSC |
| 0615-AD | Ts = −35° C.<br>DR ≈ 200 Å/min | 7% | ≈20% | ≈0% | DSC |
| 0615-AN1 | 15 CPM to 300° C.<br>300C/60 min<br>−50 CPM to 150° C. | 7% | ≈11% | ≈59% | DSC |
| 0615-AN2 | 15 CPM to 350° C.<br>350° C./60 min<br>−50 CPM to 150° C. | | ≈27% | ≈44% | DSC |
| 0615-AN3 | 15 CPM to 400° C.<br>400° C./60 min<br>−50 CPM to 150° C. | | ≈28% | ≈49% | DSC |
| 0615-AN3 | 15 CPM to 450° C.<br>450° C./60 min<br>−50 CPM to 150° C. | | ≈56% | ≈14% | DSC |

Footnotes:
*Heating and cooling rates in CPM is ° C./minute
*Annealing was performed under either nitrogen atmosphere or under 20 mTorrs vacuum.
*Test Methods:
DSC: Mettler's Differential Scanning Calorimeter is used for measurements.
All measurements are performed under nitrogen atmosphere.

IV. Conclusions

In summary, the above results indicate that a thermally stable PPX-F film consisting mainly of Beta-2 phase crystals can be obtained by the following two methods.

First, controlling the feed rate of the precursors and temperature of the wafer. However, obtaining a thermally stable PPX-F film in mainly Beta-2 form may be limited by the slow deposition rate that will result from the low feed rate. Further annealing of the films at temperatures 30° to 50° C. above $T_g$ (172° C.), preferably at temperatures above $T_1$ (280° C.) for 30 to 60 minutes can largely increase the crystallinity and the amount of Beta-2 phase crystals in the films (Experiment 8).

The second method involves the post-treatment of a film that has already been deposited. By annealing a film at temperatures ranging from 10° to 20° C. below its $T_2$ to about 30° to 50° C. below its $T_m$, then by quenching the film to temperatures ranging from 20° to 50° C. below its $T_2$, highly crystalline PPX-F films in the Beta-2 phase can be obtained. For practical applications, the minimum annealing temperature should be equal to $T_2$ to shorten the needed annealing time, and to ensure a complete transformation of Beta-1 to Beta-2 phase crystals in the PPX-F films. Low annealing temperatures, about 60° to 70° C. below $T_m$, are very ineffective for re-crystallizing films in the amorphous phase, or for improving the crystallinity of annealed films. The desirable annealing time depends on the annealing temperature employed. At lower annealing temperatures, longer annealing times are needed to obtain higher crystallinity in the Beta-2 phase. When annealing temperature is close to $T_2$, the annealing time can be as short as 2 to 5 minutes.

When the upper annealing temperature is higher than 450° C., even the presence of a few parts per million of oxygen, which is common in "nitrogen purged conditions," will cause the PPX-F film to be oxidized or decomposed. In addition, short-term exposure of the PPX-F film, even for a few minutes, to temperatures approaching its $T_m$ will cause partial melting of the Beta-2 crystals and should be avoided. Quenching should be conducted at a cooling rate of at least 30° to 50° C./minute, preferably from 70° to 100° C./minute when possible.

A stabilized PPX-F film should be in the Beta-2 crystalline phase, have a heat of melting of at least 20 to 30 J/g, preferably 30 to 40 J/g, and have a $T_m$ of at least 490° C. According to experimental results, the above PPX-F film has a dimensional stability up to 450° C. for at least 30 minutes under inert conditions. A PPX-F film with a lower heat of melting or lower melting temperature has low crystallinity or low molecular weight contamination and thus is not desirable.

Once a PPX-F film is stabilized, the film can stay at its thermally stable Beta-2 phase, except under two conditions that should therefore be avoided. First, the film can change back to its less thermally stable Beta-1 phase if the film is heated to temperatures above $T_2$ and then slowly cooled because the $T_2$ transformation is a thermodynamically "reversible" process. Therefore, whenever a stabilized PPX-F film is exposed to temperatures above its $T_2$, to regain its stable Beta-2 phase the film should be quenched back to temperatures at least 30° to 50° C. below its $T_2$. This is especially critical for processing engineers to remember during integration of the stabilized films into IC's. When a stabilized film is integrated beyond a bi-layer or composite structure and was exposed to temperatures above its $T_2$, the film had to be quenched to ensure the integrity of the stabilized film for further processing.

Second, if the films are further exposed to temperatures 20° to 30° C. below $T_m$, partial melting reduces the Beta-2 phase crystallinity. If the films are quenched from this state, loss of crystallinity and film instability will occur. However, if the films are slowly cooled to a desirable annealing temperature, mentioned above, and further annealed, the degree of crystallinity might be regained or even improved unless decomposition has occurred.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications, and variations as falling within the true scope and spirit of the present invention.

What is claimed is:

1. A method of preparing a thermally stable polymer film comprising:

co-polymerizing diradical intermediates with a predetermined feed rate onto a substrate having a substrate-temperature to form a co-polymer film, wherein the co-polymer film has about 24% or more Beta-2 crystals;

annealing the co-polymer film to an annealing-temperature for a first-period of time to form an annealed-polymer-film;

cooling the annealed polymer-film at a cooling rate of about 30° C. per minute or greater to form the thermally stable polymer film, wherein, the co-polymerizing, annealing, and cooling occur under a vacuum with a low system leakage rate, or under an inert atmosphere, or both;

the thermally stable polymer film is chemically and dimensionally stable at temperatures up to at least 400° C. for at least 30 minutes;

the thermally stable polymer film is suitable for fabricating integrated circuits ("IC's");

wherein, the co-polymer film has:

a melting temperature ("$T_M$");

a reversible crystal transformation temperature ("$T_2$");

an irreversible crystal transformation temperature ("$T_1$"); and a glass transition temperature ("$T_g$"); and wherein, the $T_M$ is greater than the $T_2$;

the $T_2$ is greater than the $T_1$; and the $T_1$ is greater than the $T_g$.

2. The method of claim 1, wherein the diradical intermediates have a general structure of:

X is hydrogen or fluorine;

Ar is an aromatic structure having between 6 and 30 carbons; and e is an unpaired electron.

3. The method of claim 1, wherein the predetermined feed rate is equal to or less than 1.0 mMol/minute.

4. The method of claim 1, wherein the predetermined feed rate is less than 0.05 mMol/minute.

5. The method of claim 3, wherein the annealing-temperature is above the $T_1$.

6. The method of claim 3, wherein the annealing-temperature is 30° C. to 50° C. above the $T_g$.

7. The method of claim 1, wherein the annealing-temperature is about 10° C. to 20° C. below the $T_2$ to about 30° C. to 50° C. below the $T_m$.

8. The method of claim 1, wherein the first period of time is 60 minutes or less.

9. The method of claim 1, wherein co-polymerizing is performed at a temperature equal to or below a diradical-intermediate-melting-temperature.

10. The method of claim 1, wherein the substrate temperature is equal to or below −30° C.

11. The method of claim 1, wherein the substrate temperature is below −35° C.

12. The method of claim 2, wherein the aromatic is selected from the group consisting of $C_6H_{4-n}F_n$ (n=0 to 4), $C_{10}H_{6-n}F_n$ (n=0 to 6), $C_{12}H_{8-n}F_n$ (n=0 to 8), $C_{14}H_{8-n}F_n$ (n=0 to 8), $C_{16}H_{8-n}F_n$ (n=0 to 8), and $C_{16}H_{10-n}F_n$ (n=0 to 10).

13. The method of claim 1, wherein the thermally stable polymer film is a PPX film having a general structure of:

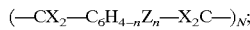

$(-CX_2-C_6H_{4-n}Z_n-X_2C-)_N$;

wherein,
X is H or F;
Z is F;
n is an integer between 0 and 4; and
N is the number of repeating units and N is greater than 10.

14. The method of claim 13, wherein N is greater than 20.

15. The method of claim 13, wherein N is greater than 50.

16. The method of claim 13, wherein the PPX film is transparent and semicrystalline.

17. The method of claim 13, wherein the PPX film is PPX-F, having a repeating unit structure of $(-CF_2-C_6H_4-F_2C-)$.

18. The method of claim 1, wherein the thermally stable polymer film comprises a PPX film having a crystalline character.

19. The method of claim 18, wherein the crystalline character comprises greater than 50% crystallinity.

20. The method of claim 18, wherein the PPX film is PPX-F, having a repeating unit structure of $(-CF_2-C_6H_4-F_2C-)$.

21. The method of claim 1, wherein the thermally stable polymer film has a repeating unit selected from a group consisting of $(-CH_2-C_6H_4-H_2C-)$, $(-CF_2-C_6H_4-F_2C-)$, $(-CF_2-C_6F_4-F_2C-)$, $(-CH_2-C_6F_4-H_2C-)$, $(-CF_2-C_6H_2F_2-CF_2-)$, and $(-CF_2-C_6F_4-H_2C-)$.

22. The method of claim 1, wherein the vacuum has a pressure below 100 mTorrs.

23. The method of claim 1, wherein the vacuum has a pressure below 30 mTorrs.

24. The method of claim 1, wherein the low system leakage rate is less than 2 mTorrs/minute.

25. The method of claim 1, wherein the low system leakage rate is less than 0.4 mTorrs/minute.

26. The method of claim 1, wherein the annealing temperature of the co-polymer film is equal to or higher than a maximum processing temperature ("$T_{max}$");

wherein, the $T_{max}$ comprises a processing temperature that the thermal stable polymer film will reach for a fabrication-time period between 10 and 60 minutes; the fabrication-time period occurring during a fabrication process of the thermal stable polymer film into the integrated circuit.

27. The method of claim 26, wherein the maximum temperature, $T_{max}$, is equal or smaller than the $T_2$.

* * * * *